US005801800A

United States Patent [19]

Wright et al.

[11] Patent Number: 5,801,800

[45] Date of Patent: Sep. 1, 1998

[54] VISUAL DISPLAY SYSTEM FOR DISPLAY RESOLUTION ENHANCEMENT

[75] Inventors: Phil Wright, Scottsdale; Diana Chen, Gilbert; Fred V. Richard, Scottsdale; Karen E. Jachimowicz, Laveen; Rong-Ting Huang, Gilbert, all of Ariz.

[73] Assignee: Motorola, Inc., Schaumburg, Ill.

[21] Appl. No.: 638,709

[22] Filed: Apr. 29, 1996

[51] Int. Cl.$^{6}$ .......................... G02F 1/1347; G02F 1/1335

[52] U.S. Cl. ........................................ 349/77; 349/7

[58] Field of Search ........................ 349/77, 82, 5, 349/6, 7, 74

[56] References Cited

U.S. PATENT DOCUMENTS

| | | | |
|---|---|---|---|
| 4,384,763 | 5/1983 | Russo | 349/82 |
| 4,448,490 | 5/1984 | Shibuya et al. | 349/82 |
| 4,952,036 | 8/1990 | Gulick | 349/82 |
| 5,144,471 | 9/1992 | Takanashi | 349/77 |
| 5,299,042 | 3/1994 | Takanashi | 349/7 |

FOREIGN PATENT DOCUMENTS

| | | | |
|---|---|---|---|
| 4-355715 | 12/1992 | Japan | 349/82 |
| 6-95140 | 4/1994 | Japan | 349/82 |

*Primary Examiner*—Anita Pellman Gross
*Assistant Examiner*—Tiep H. Nguyen
*Attorney, Agent, or Firm*—Eugene A. Parsons

[57] ABSTRACT

A visual display system, composed of an array of light emitting devices, forming an image source, a phase spatial light modulator scanner, driver/control circuitry and an optical magnification system. The display system being enclosed within a housing, thereby forming an optical magnifier. The phase spatial light modulator scanner is operative in either a transmissive mode or a reflective mode. In operation, an external stimulus, such as a voltage, is applied to the scanner, thereby changing the phase of light emitted therethrough. The scanning action enhances display resolution of the generated resultant image without an increase in the number of pixels of the image source. The phase spatial light modulator scanner operates by scanning sub-pixels, pixel groups, and/or sub-arrays of the image source.

19 Claims, 5 Drawing Sheets

20

100

10

10'

20

30

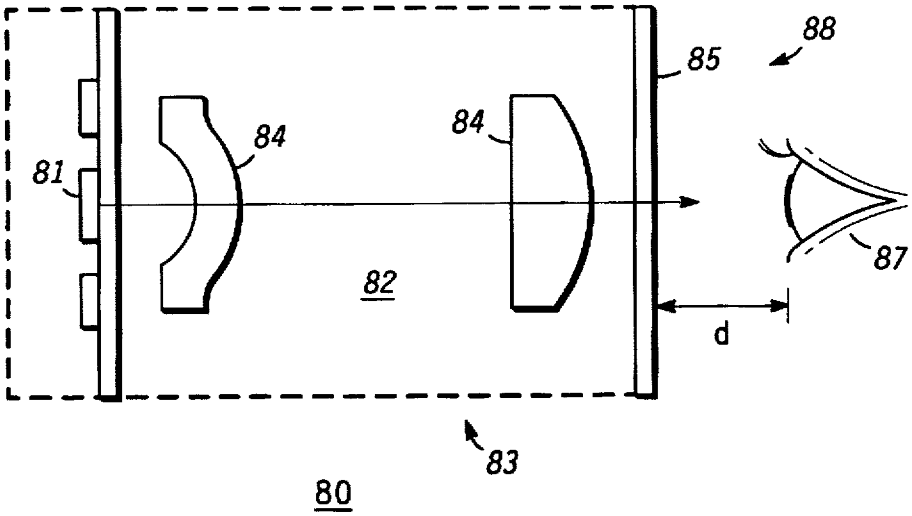
FIG. 8
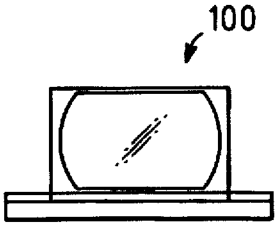
FIG. 9
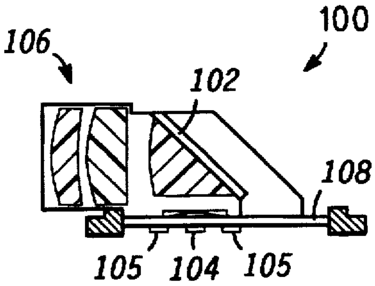
FIG. 10
FIG. 11
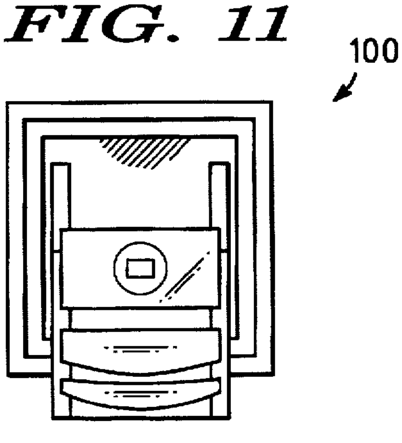

VISUAL DISPLAY SYSTEM FOR DISPLAY RESOLUTION ENHANCEMENT

FIELD OF THE INVENTION

The present invention pertains to the field of miniature visual displays, and more particularly to miniature visual display systems that utilize scanning techniques to project a fully integrated image within an observer's field of view.

BACKGROUND OF THE INVENTION

The human visual system is a complex system with a great ability to absorb vast amounts of information originating in m any varying formats, including visual displays. Visual displays are found in varying sizes and forms in today's world, displaying many types of information, from large visual display screens announcing scheduling information found in airports, to small visual displays, such as those incorporated into pocket calculators. Of concern in the reduction in the size of visual displays, specifically those utilized in portable electronic devices, such as portable communications equipment, smart-card reader devices, or the like, is the display resolution quality and the maintenance of minimal power requirements and low manufacturing costs.

Of relevance in the reduction in size of visual displays, and the maintenance of resolution quality, is the human visual system's ability to process and integrate information, and the speed at which the visual system is able to do so. The human visual system can process and interpret information no faster than approximately 60 Hz. Therefore, an image that is projected and scanned within 1/60th of a second to varying positions within a visual display is seen by the eyes of the viewer as one enlarged integrated image. As an example, by moving an image of an "A" to six different locations within a visual display, at a speed of 60 Hz, the viewer will see one integrated image composed of six "A"s. If the image is simultaneously content modulated, for example, the images are of six letters "A", "B", "C", "D", "E" and "F" that are individually and sequentially moved to six varying positions at a speed of 60 Hz., the viewer will see one integrated image composed of the six letters. This process, more commonly known as time-multiplexed imagery, can be utilized in the field of display technology through the use of scanners, and more specifically in the development of enhanced resolution miniature visual displays.

A vast amount of effort has been expended to develop compact, lightweight, low-power visual displays. As display technology reduced the size of visual displays, the resolution of such displays was difficult to maintain. Of greatest importance in the development of these miniature visual displays is the display resolution that is able to be achieved while maintaining and/or decreasing manufacturing costs. It has been shown that as the active area of a display decreases, pixel size must decrease to maintain resolution. As higher resolution is desired, the number of pixels and the cost of material and manufacturing increases, in part because of the number of electrical interconnects required for the increased number of pixels. As a result, the manufacturing yield decreases significantly.

Scanning devices utilized today aid in increasing the resolution of visual displays. These scanning devices can be found in many forms, most commonly electromechanical scanners incorporating mirrors, such as galvanometric scanners and polygonal scanners. These types of electromechanical scanners are commonly quite large in size, therefore not amenable to the incorporation into a display device that is small, lightweight, operates with low power consumption and is meant to be portable in nature. In addition, mechanical scanners are complex and thus expensive to manufacture and in many instances utilize great amounts of power during operation.

Thus, there is a need for a miniature visual display that incorporates a small scanning device that allows for the generation of a high resolution miniature visual display, either direct, projection, or virtual, that operates by scanning sub-pixels, pixel groups, and/or sub-arrays, thereby utilizing fewer pixel numbers, thus fewer interconnects, leading to an increase in manufacturing yield, thereby decreasing manufacturing costs.

Accordingly, it is highly desirable to provide for a scanning device, that utilizes a phase spatial light modulator scanner for phase modulation, thereby providing for the scanning of individual sub-pixels, pixel groups, and/or sub-arrays, thus generating a low-powered miniature visual display with resolution enhancement.

It is a purpose of the present invention to provide a new and improved phase spatial light modulator scanner for display resolution enhancement for use in miniature visual displays.

It is a further purpose of the present invention to provide a new and improved visual display system for display resolution enhancement which utilizes a phase spatial light modulator scanner for phase modulation of the light emitted by an image source, thereby allowing for the incorporation of the scanner into miniature visual displays.

It is another purpose of the present invention to provide for a method of scanning a sub-pixel, a pixel group, and/or a sub-array utilizing a phase spatial light modulator scanner and an applied external stimulus, that can be incorporated into a miniature visual display.

It is another purpose of the present invention to provide a new and improved scanning method that allows for the scanning of sub-pixels, pixel groups, or sub-arrays while maintaining resolution quality of the image viewed.

SUMMARY OF THE INVENTION

The above problems and others are substantially solved and the above purposes and others are realized in a visual display system composed of an image source, a phase spatial light modulator scanner, driver/control circuits and optical elements, that is incorporated into a miniature visual display. In the preferred embodiment the phase spatial light modulator scanner utilizes liquid crystal material to spatially modulate the phase of light generated by an array of light emitting devices, most commonly light emitting diodes or vertical cavity surface emitting lasers (VCSELs), thereby generating a resultant integrated image and enhancing the resolution of the integrated image being viewed. It should be understood that alternative light or image generating devices can be utilized such as organic light emitting diodes (LEDs), cathode ray tubes (CRTs), field emission displays (FEDs), electroluminescent displays, plasma displays, liquid crystal displays (LCDs), etc., but the general term "light emitting devices" will be utilized throughout this disclosure for the sake of simplicity.

In general, the phase spatial light modulator scanner of the present invention serves to spatially modulate the phase of the light, thus the directional path of the light passing therethrough. In the instance where a liquid crystal phase spatial light modulator scanner is used, hereinafter referred to as a liquid crystal scanner, this is accomplished based on the principle that the structural organization of the molecules, which compose the liquid crystal material, is not rigid, meaning that the molecules can be easily reoriented as a direct result of an external stimulus. This exertion of an external stimulus on the liquid crystal material results in the reorientation of the molecular structure of the liquid crystal material, thereby causing the light passing therethrough to undergo a phase change. Simply stated, the phase change is a function of the external stimulus, or in the present invention, the voltage applied, yet is not necessarily proportional. It should be understood that varying amounts of voltage applied to the liquid crystal, will result in varying phase modulations, thus varying the directional travel of the light passing therethrough.

During the operation of the liquid crystal scanner of the present invention, a voltage is applied to the liquid crystal scanner, thereby changing the molecular orientation of the liquid crystal material and causing a resulting change in optical characteristics, such as double refraction/birefringence effect, optical rotation, dichroism or optical scattering. This reorientation of the molecular structure of the liquid crystal material is converted to a visible change in fill factor and/or number of pixels of the generated integrated image when viewed by the observer. More specifically, the phase of the generated light waves is spatially modulated to produce a directional change and produce the integrated image viewed by the observer. The integrated image appears to have higher resolution, and higher fill factor, yet the number of active pixels on the image source remains the same.

In application, the liquid crystal scanner can be positioned to operate in either a transmissive mode or a reflective mode dependent upon the structure of the optical display and the desired result. When operating in a transmissive mode, the liquid crystal scanner is positioned so that the light generated by the array of light emitting devices passes directly through the scanner and is scanned to create an integrated image through phase modulation. When the scanner is operating in the reflective mode, the liquid crystal scanner has formed on a surface a reflective element, and is positioned so that the light generated by the array passes through the scanner twice, thereby undergoing a phase change of approximately double that incurred when operating in the transmissive mode having a layer of liquid crystal material of approximately the same thickness, or in the alternative undergoing a phase change similar to that incurred in the transmissive mode when the layer of liquid crystal material is formed approximately one-half the thickness of that used in the transmissive mode.

The scanner operates by scanning sub-pixels, pixel groups, and/or sub-arrays to generate an integrated image through phase modulation. The scanning serves to spatially modulate the phase, thus the direction of travel, of the light, thereby spatially modulating the emitted light and producing another portion of the integrated image. The number of active pixels on the image source remains the same, in that no additional active area, or pixels, etc. are being utilized, yet the resolution and fill factor of the generated integrated image is dramatically increased through the scanning process.

BRIEF DESCRIPTION OF THE DRAWINGS

The novel features believed characteristic of the invention are set forth in the claims. The invention itself, however, as well as other features and advantages thereof will be best understood by reference to detailed descriptions which follow, when read in conjunction with the accompanying drawings, wherein:

FIG. 8 is a simplified schematic view of a miniature visual image display incorporating the transmissive liquid crystal scanner of the present invention;

FIGS. 9, 10 and 11 illustrate a front view, side elevational view, and a top plan, respectively, of an image manifestation apparatus utilizing the liquid crystal scanner of the present invention;

DETAILED DESCRIPTION OF THE PREFERRED EMBODIMENTS

Figure 1:
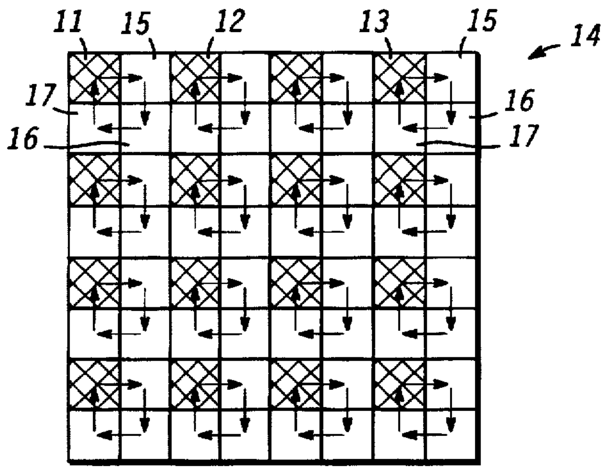
FIG. 1 is a simplified top view of an array in which sub-pixel scanning is utilized for enhanced resolution.

During the course of this description, like numbers are used to identify like elements according to the different figures that illustrate the invention. The present invention is based on utilizing individually addressable visible light emitting devices formed in an array, that in combination with driver/control circuitry and optical elements compose a light emitting device display chip, or image source, of the present invention. To increase the resolution for a given number of light emitting devices or to reduce the number of light emitting devices needed to achieve a desired resolution, various scanning techniques may be employed. The light emitting device display chip serves as the image source for a visual display system whereby a resulting integrated image is formed by scanning portions or elements of the array of light emitting devices, through a light modulating scanner, thereby spatially modulating the phase of the light emitted by that portion. This phase modulation serves to change the directional travel and in essence "moves" the light to another portion of the display. This scanning action forms what appears to the observer to be a high resolution resultant integrated image. Those skilled in the art will appreciate that scanning allows a full page display to be created from a much smaller number of display devices than is necessary to generate the full page display. The resultant integrated image is viewable as one of a direct view image, a virtual image, or a projected image.

The scanning process utilized in the present invention is based on the principle of phase modulation, thereby altering the path of light emitted by portions or elements of the array.

More particularly, in the preferred embodiment a liquid crystal scanner, composed of a plurality of liquid crystal scanner pixels, is utilized to which an external stimulus is applied, thereby altering the molecular orientation of the liquid crystal material contained therein and resulting in a phase modulation of the light passing therethrough. This resulting phase modulation allows for the image source, having minimal pixel numbers and low fill factor, in combination with the liquid crystal scanner, to generate an integrated image that appears to be composed of a much greater number of pixels. It should be understood that while the preferred embodiment is described utilizing a liquid crystal phase spatial light modulator scanner, simply referred to as a liquid crystal scanner, that other types of phase spatial light modulator scanners, such as electro-optic scanners, acousto-optic scanners, or the like, could be utilized.

As previously stated, the purpose of this disclosure is to provide for a miniature visual display system, composed of a light emitting device display chip, a phase spatial light modulator scanner, driver/control circuitry, and a plurality of optical elements. In the preferred embodiment, the use of a miniature liquid crystal scanner to bring about the phase modulation of the light emitted by the display chip, allows for the display system to remain small in size and permits it to be incorporated into miniature visual displays such as those found in portable electronics equipment, or the like.

Referring now to the accompanying illustrations, disclosed are three methods of scanning a light emitting device array, namely sub-pixel scanning, sub-array scanning, and pixel group scanning, according to the present invention. It should be understood that dependent upon the image source and the desired resultant image, the scanning techniques described herein can be utilized individually or in combination. Specifically, with regard to FIG. 1, illustrated is the sub-pixel scanning technique according to the present invention. Shown in a simplified top view is a portion of an array 10 of light emitting devices 11. It should be understood that various sources of light or image generating devices can be utilized such as inorganic or organic light emitting diodes (LEDs), vertical cavity surface emitting lasers (VCSELs), cathode ray tubes (CRTs), field emission displays (FEDs), electroluminescent displays, plasma displays, liquid crystal displays (LCDs), etc., which may be formed in a two-dimensional array. The general term "light emitting devices" will be utilized throughout this disclosure for the sake of simplicity. As illustrated, array 10 of light emitting devices 11 defines a plurality of pixels 12. Each pixel 12 of array 10 is fabricated to define an active area 13 and an inactive area 14. Inactive area 14 can be further subdivided into a first inactive area 15, a second inactive area 16, and a third inactive area 17. In this specific example the active area 13 of each pixel 12 covers 25% of the individual pixel 12 area, and is characterized in the illustration by shading. During the scanning process, varying external voltages are applied to a phase spatial light modulator scanner, in the preferred embodiment namely a liquid crystal scanner (discussed presently), which is incorporated into the visual display system. The light emitted by array 10 passes through the liquid crystal scanner, resulting in a scanning action of the image of the pixel 12, or active area 13 of each pixel 12, through the first inactive area 15, then to the second inactive area 16 and the third inactive area 17, of each pixel 12, generally as shown by the directional arrows of FIG. 1. Generally speaking, the active area 13 of each pixel 12 is scanned, meaning the light or portion of an image represented by that pixel 12 passes through the liquid crystal scanner to which a voltage has been applied, and the resultant light emitted, having undergone a change in phase, changes direction of travel to fill the first, second and third inactive areas 15, 16, and 17, respectively, of each pixel 12 with a specific portion of the image. The scanning action works by scanning image data information. If the same image data information is scanned for each portion of inactive area 14, then the resultant integrated image appears to have a higher fill factor. If different data information is scanned for each portion of inactive area 14, then the resultant integrated image appears to have both a higher fill factor and higher resolution, although, there is no actual increase in the number of pixels 12, or fill factor of the image source, in either instance.

Figure 2:
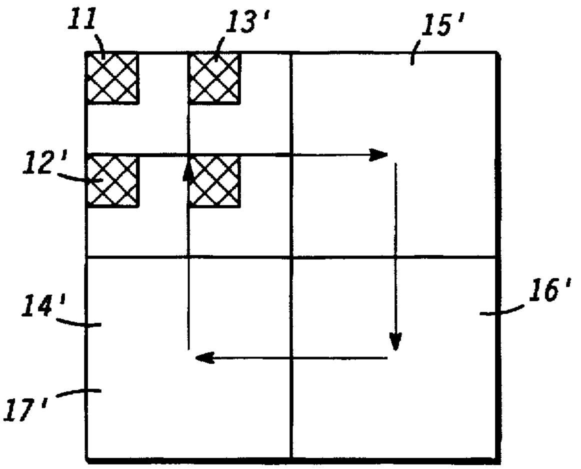
FIG. 2 is a simplified top view of an array in which pixel group scanning is utilized according to the present invention.

Referring now to FIG. 2, illustrated is the pixel-group scanning technique according to the present invention. It should be noted that all components similar to the components illustrated in FIG. 1, are designated with similar numbers, having a prime added to indicate the different embodiment or scanning technique utilized. Illustrated in FIG. 2 in a simplified top view is a partial array 10' of light emitting devices 11'. In this example, approximately 25% of the partial array 10', correlating to 25% of the whole array is considered active, represented in FIG. 2 as active area 13', while 75% remains inactive, represented in FIG. 2 as inactive area 14'. In operation, a group of pixels 12' are scanned together to form a sub-part of array 10'. More specifically, the light emitted by the group of pixels 12', passes through a specific portion of the liquid crystal scanner to which a specific voltage has been applied. The light passing therethrough undergoes a change in phase, thereby a change in the direction of travel. As previously described for FIG. 1, the change in phase causes the image of the pixel 12' to move through the inactive area 14', more specifically, the image of the pixel 12' moves to a first inactive area 15', then to a second inactive area 16', and finally to a third inactive area 17', as represented by the directional arrows in FIG. 2. These phase changes result in a resulting integrated image characterized by an increased fill factor and 4× the number of addressable pixels. By using this scanning technique, an integrated image is formed having higher resolution, yet no additional pixels 12' are required of the image source.

Figure 3:
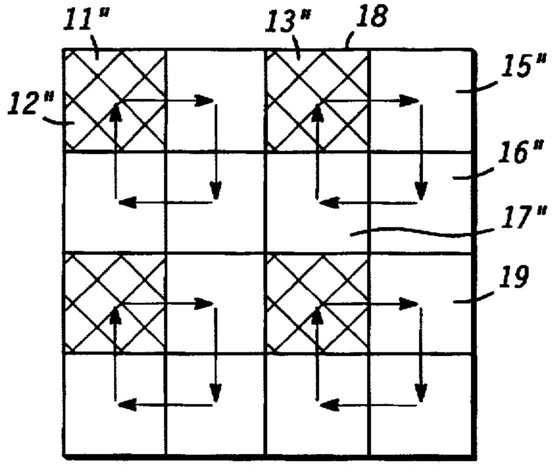
FIG. 3 is a simplified top view of an array in which sub-array scanning is utilized according to the present invention.

Referring now to FIG. 3, illustrated is a simplified top view of the sub-array scanning technique, of the present invention. It should be noted that all components similar to the components illustrated in FIGS. 1 and 2, are designated with similar numbers, having a double prime added to indicate the different embodiment or scanning technique utilized. The sub-array scanning technique, according to the present invention, utilizes two or more arrays of light emitting devices 11', which may be formed in a two-dimensional array, and is similar to the previously disclosed scanning techniques, except that in this technique a larger array of light emitting devices 11" is divided into sub-arrays, referenced here as sub-arrays 18, each composed of a plurality of pixels 12", which are initially mounted to a substrate 19, such as glass, so as to define active and inactive areas, 13" and 14", respectively. During the scanning process, each sub-array 18, composed of a plurality of pixels 12", is scanned. In the preferred embodiment, the emitted light passes through the electrified liquid crystal material, thereby undergo a pre-determined phase change (discussed presently). The light emitted from each sub-array 18 is scanned to the inactive area 14", more specifically a plurality of successive inactive areas 15", 16", and 17", so as to generate a resultant integrated image, viewable by the observer. The entire set of sub-arrays 18, which compose the image source, is characterized by a 25% overall array fill factor, and having a 25% array active area and a 75% substrate 19 area. As in the previous scanning techniques, the resultant integrated image is characterized by a higher fill factor and 4× the number of addressable pixels, without the use of any additional pixels 12", than those provided by the image source.

Figure 4:
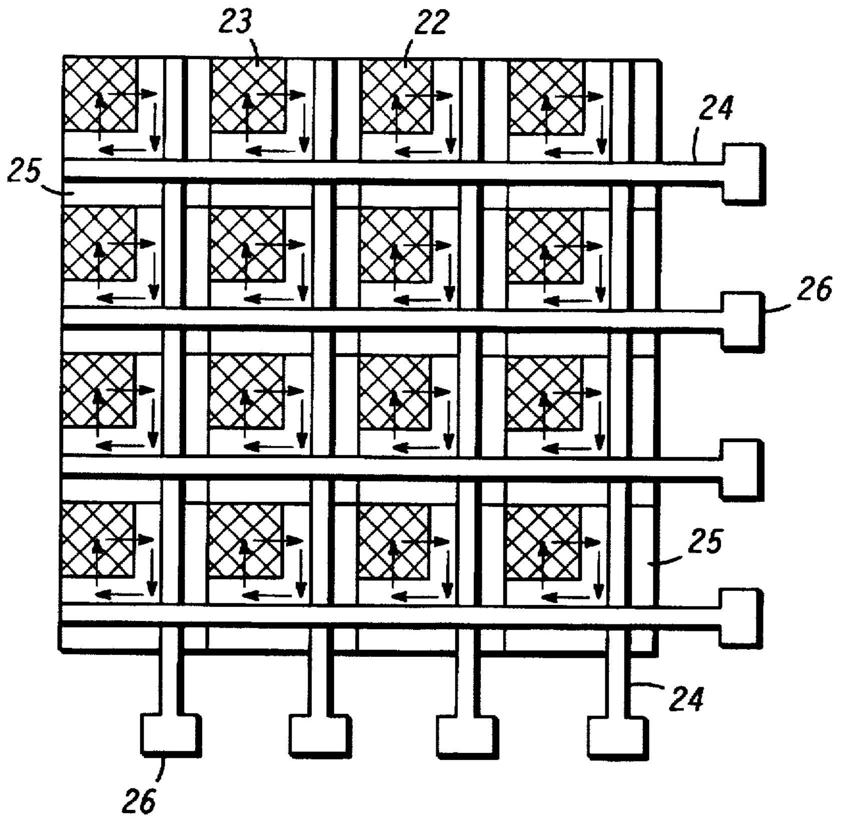
FIG. 4 is a simplified top view of an array of light emitting devices, showing the active area of each pixel and having metal line interconnects formed in the inactive areas of the pixels of the array.

Referring now to FIG. 4, illustrated in simplified top view is a partial array 20 of light emitting devices 22 of the present invention configured for sub-pixel scanning. Array 20 has a plurality of metal line interconnects 24 formed in row/column address configuration within an inactive area 25 defined by a plurality of pixels 23 of array 20. Light emitting device array 20 of the present invention is fabricated to operate by individually addressing each light emitting device 22. Array 20 is generally formed of a plurality of light emitting devices 22, positioned in a matrix of rows and columns and having row/column addressing contacts similar to those used for charged coupled device (CCD) arrays. Contacts to the light emitting devices 22 are formed by conventional deposition and/or etching techniques wherein, for example, common row and column bus contacts 26 are formed to individually address each light emitting devices 22, as is generally known in the art. There is provided a plurality of driver/control circuits (not shown) having data input terminals and further having control signal output terminals connected to the light emitting device array 20 through a plurality of connection pads (not shown), for activating and controlling each of the light emitting devices 22 of the array 20 to generate an image in accordance with data signals applied to the data input terminals.

In the present invention, fewer interconnects are needed in that there are a fewer number of pixels 23 required to be defined by the array 20, because of the utilization of scanning. Because of this decreased number of interconnects, the manufacturing yield of array 20 is increased, thereby decreasing the manufacturing costs. Further detailed description of the formation of array 20, in combination with driver/control circuitry and a plurality of optical element, that in combination form a light emitting device display chip, similar to that of the present invention, can be found in U.S. Pat. No. 5,432,358, entitled "Integrated Electro-Optical Package", issued Jul. 11, 1995, assigned to the same assignee and incorporated herein by this reference.

Figure 5:
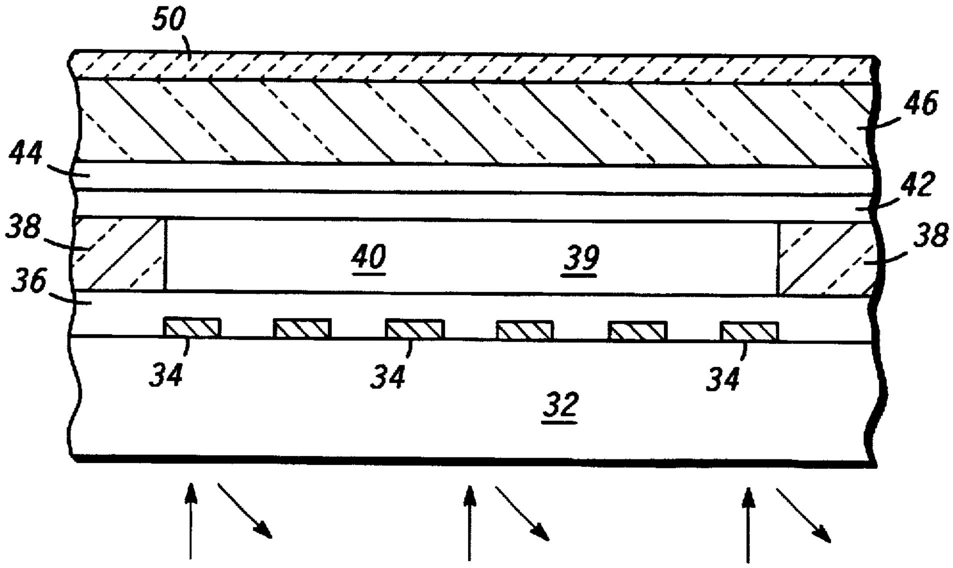
FIG. 5 is a simplified cross-sectional view of the structure of a reflective liquid crystal scanner of the present invention.
Figure 6:
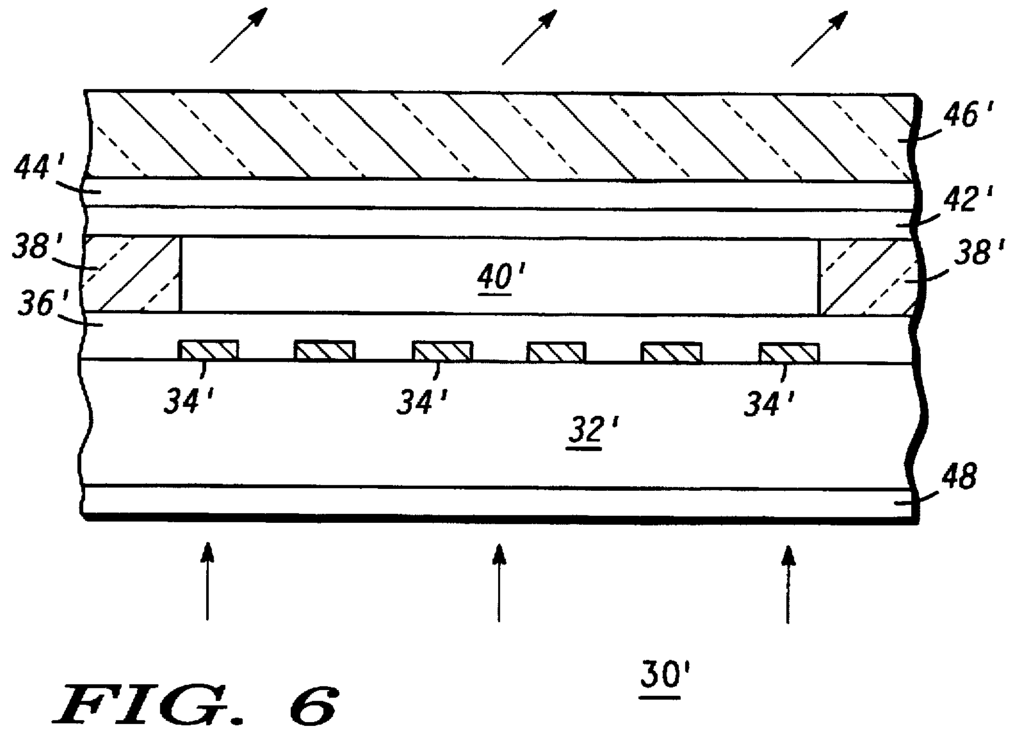
FIG. 6 is a simplified cross-sectional view of the structure of a transmissive liquid crystal scanner of the present invention.
Figure 7:
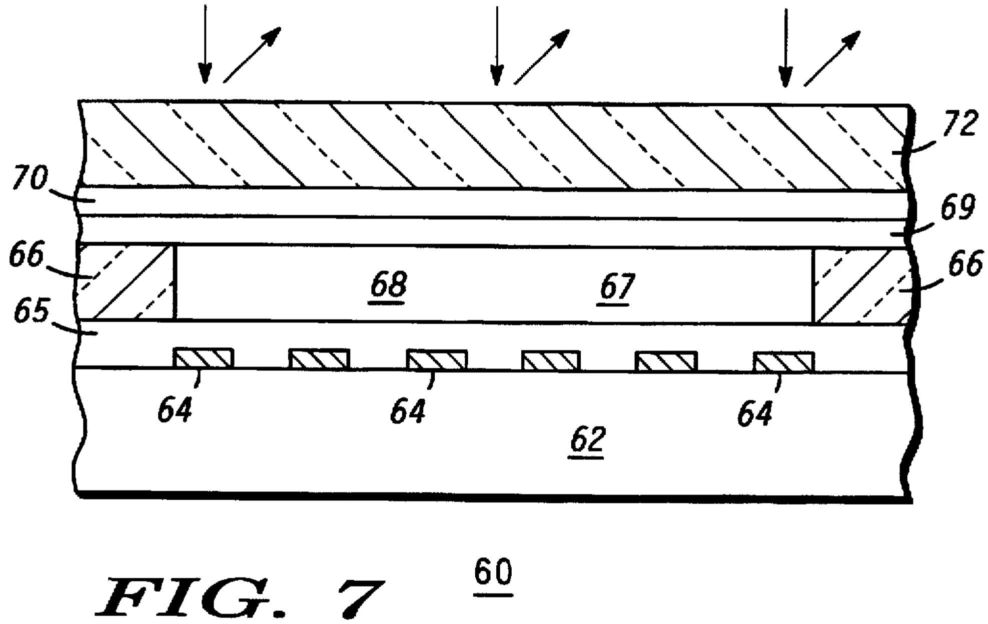
FIG. 7 is a simplified cross-sectional view of the structure of a reflective liquid crystal scanner of the present invention with integrated driver circuitry.

The scanning device of the present invention utilizes a phase spatial light modulator scanner device, in the preferred embodiment namely a liquid crystal scanner, as previously disclosed. Referring now to FIGS. 5, 6 and 7, illustrated are simplified partial cross-sectional views of a reflective liquid crystal scanner 30, a transmissive liquid crystal scanner 30' and an integrated reflective liquid crystal scanner with driver circuitry 60, respectively. As previously disclosed, in the preferred embodiment, the visual display system of the present invention incorporates an image source, and liquid crystal material to serve as a light modulating medium, thereby spatially modulating the phase of the light passing therethrough. It should be understood that throughout this disclosure when referring to a liquid crystal scanner that various liquid crystal stack fabrications, and various liquid crystal materials, including ferroelectric and nematic liquid crystal materials, can be provided which will operate in different modes in response to different signals or potentials applied thereto. The mode of operation of the scanner and the scanning technique to be utilized is dependent upon the fabrication of the array of light emitting devices of the light emitting device display chip and the configuration of an optical system (discussed presently) that are both incorporated into the visual display system of the present invention. The scanner of the present invention is fabricated to operate in either a reflective or a transmissive mode. It should be understood that the liquid crystal scanner of the preferred embodiment can be formed as a being non-pixelated, a single pixel or as an array of liquid crystal scanner pixels.

Referring specifically to FIG. 5, a simplified and enlarged partial sectional view of a reflective liquid crystal scanner 30 for use when scanning in a reflective mode (to be discussed presently) is illustrated. Reflective liquid crystal scanner 30 is generally fabricated in a stack formation and includes a substrate 32 formed of any convenient optically transparent material, such as glass. A plurality of bond or terminal pads (not shown) are formed adjacent the edges of substrate 32 and are in electrical communication with a plurality of layers of control circuits formed of a plurality of layers of electrically conductive material (discussed presently). A first electrically conductive material layer 34 is formed on an upper surface of substrate 32. First patterned electrically conductive material layer 34 is fabricated of an optically transparent material, such as indium tin oxide (ITO), thereby allowing the light impinging thereon to pass therethrough and defining an optically clear contact. A first molecular orientation layer 36 is positioned on the upper surface of transparent electrically conductive material layer 34. Molecular orientation layer 36 serves to properly position and align the molecules comprising the liquid crystal material (discussed presently), so as to orient the molecules in a specific direction when there does not exist any external stimulus, such as a voltage, acting upon the liquid crystal scanner 30.

A generally tubular glass spacer 38 is fixedly attached to the upper surface of molecular orientation layer 36 by any convenient means, such as adhesive, chemical bonding, growing and etching layers, etc. It will of course be understood that tubular glass spacer 38 could be formed in a variety of other embodiments and the present structure is illustrated only for purposes of this explanation. Tubular glass spacer 38 has an inner opening 39 defined therethrough of sufficient size to encircle the array formed by the transparent electrode patterning (to be discussed presently). The cavity defined by opening 39 in tubular glass spacer 38, having internal opposed flat surfaces, in conjunction with the upper surface of molecular orientation layer 36, is filled with a continuous layer of liquid crystal material 40. Typical examples of liquid crystal material which can be used for this purpose are disclosed in U.S. Pat. No. 4,695,650, entitled "Liquid Crystal Compounds and Compositions Containing Same", issued Sep. 22, 1987 and U.S. Pat. No. 4,835,295, entitled "Ferroelectric Liquid Crystal Compounds and Compositions", issued May 30, 1989.

A glass plate 46 has a second layer of electrically conductive material 44, patterned to further define a second contact. It should be understood that electrically conductive material layer 34 can alternatively also be patterned and would be configured orthogonal to layer of electrically conductive material 44 so as to define individual pixels. Layer 44 is formed on a lower surface of glass plate 46, and defines a second contact which in conjunction with transparent electrically conductive material layer 34 and liquid crystal material 40 form a complete two dimensional array of liquid crystal pixels, defined by the optically clear contact and a second contact. It should be understood that liquid crystal scanner 30 can alternatively be fabricated to be one-dimensional or composed of a single pixel. In the preferred embodiment the second contact is formed from an optically transparent material, such as indium-tin-oxide or the like. In an alternative embodiment, the second contact can be formed of a reflective material, such as aluminum, thereby reflecting light impinging thereon.

The electrically conductive material layers 34 and 44 are connected by a conductive lead to a bond pad (not shown) adjacent the outer edges of tubular glass spacer 38. The bond pad is then electrically connected to a bond pad on substrate 32 by any convenient means, such as wire bond, a feed through connector in the edges of tubular glass spacer 38 (not shown), etc. The bond pad is adapted to have applied thereto a common potential, such as ground or some fixed voltage, which in cooperation with various potentials applied to the contacts activates and serves to apply a voltage to each liquid crystal pixel. A second molecular orientation layer 42 is formed thereon a lower surface of patterned electrically conductive material layer 44. Liquid crystal material 40 is contained within the cavity defined by the upper surface of molecular orientation layer 36, inner opening of tubular glass spacer 38 and lower surface of molecular orientation layer 42. It will be apparent to those skilled in the art that molecular orientation layers 36 and 42 can be formed in separate or discrete layers that are simply positioned on opposing sides of tubular glass spacer 38 and sandwiched therebetween the remaining layers during assembly.

In the preferred embodiment, incorporating two layers of optically transparent electrically conductive material as illustrated in FIG. 1, a separate reflective layer 50 is provided in the liquid crystal stack so that the light passing through liquid crystal material 40, is reflected back through liquid crystal material 40 and undergoes two phase modulations. Reflective layer 50 is formed of any convenient reflective material, such as aluminum. In the alternative embodiment, where one of the layers of electrically conductive material, such as layer 44 of FIG. 1 is formed of a reflective material, such as aluminum, the contact itself serves to reflect the light impinging thereon and the need for a separate reflective layer is eliminated. In such an embodiment, the reflective electrically conductive material can be formed of aluminum or any reflective metal that can be conveniently patterned or positioned on the surface of glass plate 46 and which will reflect light impinging thereon, reflecting it back through liquid crystal material 40, undergoing a second phase modulation. While the present embodiment is described using liquid crystal material, it should be understood that other types of light modulating material might be utilized, including, for example, other types of light modulating liquid or solid material. In addition, while the preferred embodiment is described using a liquid crystal phase spatial light modulator scanner, it should be understood that this disclosure is meant to include other types of phase spatial light modulator scanners such as electro-optic scanners, acousto-optic scanners, or the like. A plurality of driver and control circuits (not shown) complete reflective liquid crystal scanner 30 which includes a two dimensional array of reflective liquid crystal pixel elements, each of which are individually addressable through connection pads. The driver and control circuits have data input terminals and control signal output terminals connected to the array of liquid crystal scanner pixels through a plurality of connection or bond pads, for activating and controlling each of the liquid crystal scanner pixels and applying a potential, or voltage, thereto. The electrical contacts of liquid crystal scanner 30 are formed in rows and columns and the addressing and switching circuitry (not shown) includes row and column electrical buses and electronic switches coupled to the contacts so that each contact, pixel, can be individually addressed. The row and column electrical buses are electrically connected to the plurality of connection pads formed adjacent the edges of glass plate 46 for external communication (addressing and controlling) with the individual pixels. To activate the reorientation of the molecular structure of a specific portion of liquid crystal material 40, the potential, or voltage, must be applied between the upper and lower contacts for that specific pixel or portion. With no potential applied, the liquid crystal material 40 is normally in a neutral condition, and any light passing therethrough would not undergo a phase modulation. While the present embodiment is explained using row and column drivers, it should be understood that in the alternative, thin film transistors (not shown) can be provided as an active drive device, positioned behind each liquid crystal scanner pixel. Thin film transistor drive devices can be utilized in either the reflective liquid crystal scanner 30 (described above), or in the transmissive liquid crystal scanner (described presently).

At least one polarization member or element (not shown) is incorporated into the visual display system of the present invention. The polarization member is positioned to allow light emitted by the light emitting device display chip of like polarization, to pass through the polarization member prior to undergoing a change in phase. If, for example, the polarization member is polarized horizontally all light similarly polarized will pass therethrough and light that is of different polarization will be absorbed. If the polarizing member is vertically polarized, similar results will occur. The polarization element is placed so that the polarization direction of the polarizing element is in the same plane as a long axis of the liquid crystal molecules, thereby allowing light passing therethrough to be modulated or steered. If the polarizing direction of the polarizing element is placed perpendicular to the long axis of the liquid crystal molecules, the phase will not be modulated. The polarization member is further positioned so that when the display system is fabricated to operate in a reflective mode, the light being reflected back through liquid crystal scanner 30, does not pass back through the polarization member a second time.

Referring now to FIG. 6, illustrated is a similar partial cross-sectional view of a transmissive liquid crystal scanner 30' according to the present invention. It should be noted that all components similar to the components illustrated in FIG. 5, are designated with similar numbers, having a prime added to indicate the different embodiment or scanning technique utilized. Transmissive liquid crystal scanner 30' is similar to the reflective liquid crystal scanner 30 previously described, except that all material comprising liquid crystal scanner 30' are optically transparent. The use of optically transparent material allows for the positioning of transmissive liquid crystal scanner 30' within a visual display system, allowing for the passage of light, emitted by the light emitting device display chip, to pass directly through scanner 30'. The light is not reflected back through the scanner as in the reflective liquid crystal scanner 30, previously described. Referring specifically to FIG. 6, illustrated is transmissive liquid crystal scanner 30', composed of an optically transparent substrate 32', optically transparent electrically conductive material layers 34' and 44', molecular orientation layers 36' and 42', glass spacer 38', liquid crystal material 40', and glass plate 46'. Liquid crystal scanner 30' is generally fabricated in a stacked manner similar to reflective liquid crystal scanner 30 of FIG. 5. As with reflective liquid crystal scanner 30, a voltage is applied to scanner 30', thereby activating the liquid crystal material 40', thus modulating the phase of the light passing therethrough according to the potential applied.

Like reflective liquid crystal scanner 30, a polarizing member (not shown), positioned within the visual display system or alternatively a polarizing layer 48, formed integral with liquid crystal scanner 30', as illustrated in FIG. 6, is provided. As in reflective liquid crystal scanner 30 previously described, the polarizing member or layer 48 is positioned to allow the for the passage of the emitted light therethrough, prior to passing through the liquid crystal material 40' and undergoing a phase change. In that the transmissive liquid crystal scanner 30' allows light to pass directly therethrough, and does not allow light to reflect back through the scanner 30', polarizing layer 48 can be integrally formed with the liquid crystal stack.

Illustrated in FIG. 7 is a simplified partial cross-sectional view of yet another embodiment of a reflective liquid crystal scanner with integrated drive circuitry, designated 60. Liquid crystal scanner 60 is essentially formed according to the above disclosed embodiment for reflective liquid crystal scanner 30 in which reflective elements or layers are utilized in lieu of or in combination with the layers of electrically conductive material to define the pixels. In liquid crystal scanner 60, the drive circuitry is integrated with the scanner by forming a plurality of metal pads 64 directly on an upper surface of a silicon chip 62 having formed therein the driver circuitry. There is provided a molecular orientation layer 65 positioned on an upper surface of the metal pads 64 and silicon chip 62. A tubular glass spacer 66 is provided on an upper surface of molecular orientation layer 65, defining an inner opening 67, or cavity therein. There is positioned within opening 67, a liquid crystal material 68, encapsulated by molecular orientation layer 65, glass spacer 66 and a second molecular orientation layer 69. It should be understood that while two separate molecular orientation layers are disclosed with the varying embodiments of the reflective and transmissive liquid crystal scanners, fabrication utilizing only one single molecular orientation layer is anticipated by this disclosure. There is positioned on an upper surface of molecular orientation layer 69, a transparent layer 70 of electrically conductive material, such as indium tin oxide (ITO), serving as a second electrical connection for each pixel defined by the metal pads 64. A glass plate 72 is provided on an upper surface of electrically conductive material layer 70. During operation, a voltage is applied to activate the area above each metal pad, thereby reorienting the molecular structure and altering the phase of the light passing therethrough according to the potential applied. Metal pads 64 are formed of aluminum, or some convenient conductive reflective material, thereby reflecting the light back through the liquid crystal material 68, as illustrated by the directional arrows in FIG. 7, so as to cause the light to undergo a second phase modulation.

As previously disclosed, at least one polarizing member (not shown) is provided and positioned within the display system, at a point prior to the light passing through liquid crystal material 68. The polarizing member permits light of a particular polarization to pass once therethrough prior to undergoing a change in phase as a result of liquid crystal material 68, but is positioned so that light reflected back through the liquid crystal scanner 60 does not pass through the polarizing member a second time.

Thus, a new and improved scanning technique which is incorporated into a visual display system, more specifically an electro-optical system, additionally composed of a light emitting device display chip, driver/control circuitry and optical elements (discussed presently), is disclosed which is relatively easy and inexpensive to manufacture. The visual display system includes various optical components while conveniently integrating electrical connections to the components and providing external connections thereto. Light sources, polarizers, diffusers and, if desired, additional optics are conveniently integrated into the system which is easily integrated into portable electronic equipment. It is further disclosed that additional optical elements, such as polarizer plates or layers, refractive elements, diffractive elements, etc. may be easily positioned exterior the visual display system.

It should be understood that the resultant integrated image generated by the visual display system, composed of the light emitting device display chip, the phase spatial light modulator scanner, driver/control circuits and various optical elements, is too small to properly perceive (fully understand) with the human eye and generally requires a magnification of at least 10× for comfortable and complete viewing. Several examples of optical magnification systems which may have incorporated therein the visual display system of the present invention are illustrated in FIGS. 8 through 13, explained below.

Referring to FIG. 8, a miniature visual image display 80 is illustrated in a simplified schematic view. Miniature visual image display 80 includes image generation apparatus 81, similar to the light emitting device display chips described above, for providing an image. A plurality of driver/control circuits are provided, and interfaced with image generation apparatus 81. An optical system, represented by lens system 83, composed of a plurality of optical elements 84, is positioned in spaced relation to image generation apparatus 81 of miniature visual image display 80. A transmissive phase spatial light modulator scanner 85, generally similar to transmissive liquid crystal scanner 30' described above, having integrally formed a polarizing layer, is positioned to allow the light emitted by image generation apparatus 81 to pass therethrough and produces an image viewable by an eye 87 spaced from an aperture 88.

In operation, the light generated by image generation apparatus 81 passes through lens system 83, and transmissive phase spatial light modulator scanner. In the preferred embodiment, utilizing a liquid crystal phase spatial light modulator scanner 85, varying external voltages are applied to liquid crystal scanner 85, thereby reorienting the molecular structure of the liquid crystal material contained therein, resulting in a scanning effect of the pixels of image generation apparatus 81. The resultant high resolution integrated image viewable by the eye 87 of the observer through aperture 88 appears to have higher resolution and a higher fill factor than image generation apparatus 81, while the number of pixels of the image generation apparatus 81 remains the same.

Lens system 83, represented schematically by a plurality of optical elements mounted in spaced relation from image generation apparatus 81, receive the image from image generation apparatus 81 and magnify it an additional predetermined amount. It will of course be understood that the lens system may be adjustable for focus and additional magnification, if desired, or may be fixed in a separate housing for simplicity. It should be noted that additional optical elements can be provided exterior the miniature visual image display 80 for further image magnification and/or correction.

Eye relief is the distance that eye 87 can be positioned from viewing aperture 88 and still properly view the image, which distance is denoted by "d" in FIG. 8. Because of the size of lens system 83, eye relief, or the distance d, is sufficient to provide comfortable viewing and in the present embodiment is great enough to allow a viewer to wear normal eyeglasses, if desired. Because of the improved eye relief the operator can wear normal corrective lenses (personal eyeglasses), and the complexity of focusing and other adjustable features can be reduced, therefore, simplifying the construction of miniature visual image display 80.

There is provided a light polarizing element positioned so that all light entering or exiting an optical magnifier 82, defined by miniature visual image display 80, passes through and is polarized by the polarizing element. It will of course be understood that the polarizing element can be deposited on the surface of a mounting substrate to which image generation apparatus 81 is mounted, fabricated as a separate element positioned between image generation apparatus 81 and liquid crystal scanner 85, or as illustrated in FIG. 8, formed integral with liquid crystal scanner 85.

Referring now to FIGS. 9, 10 and 11, another miniature visual image display 100, in accordance with the present invention, is illustrated in a front view, side elevational view, and top plan, respectively. FIGS. 9, 10 and 11 illustrate miniature visual image display 100 approximately the actual size to provide an indication as to the extent of the reduction in size achieved by the present invention. Miniature visual image display 100 includes a reflective phase spatial light modulator scanner, namely a reflective liquid crystal scanner 102, (generally similar to reflective liquid crystal scanner 30 and 60, described above), an image generation apparatus 104, (generally similar to the light emitting device display chips, described above), a plurality of driver/control circuits 105, and a plurality of optical elements, which comprise an optical magnification system 106. Image generation apparatus 104 is mounted in electrical interface with a standard printed circuit board 108. Reflective liquid crystal scanner 102 is mounted to optical magnification system 106, thereby allowing the light emitted by image generation apparatus 104 to pass through reflective liquid crystal scanner 102 and be reflected back through scanner 102 when exiting the optical magnifier formed by optical magnification system 106.

Figure 12:
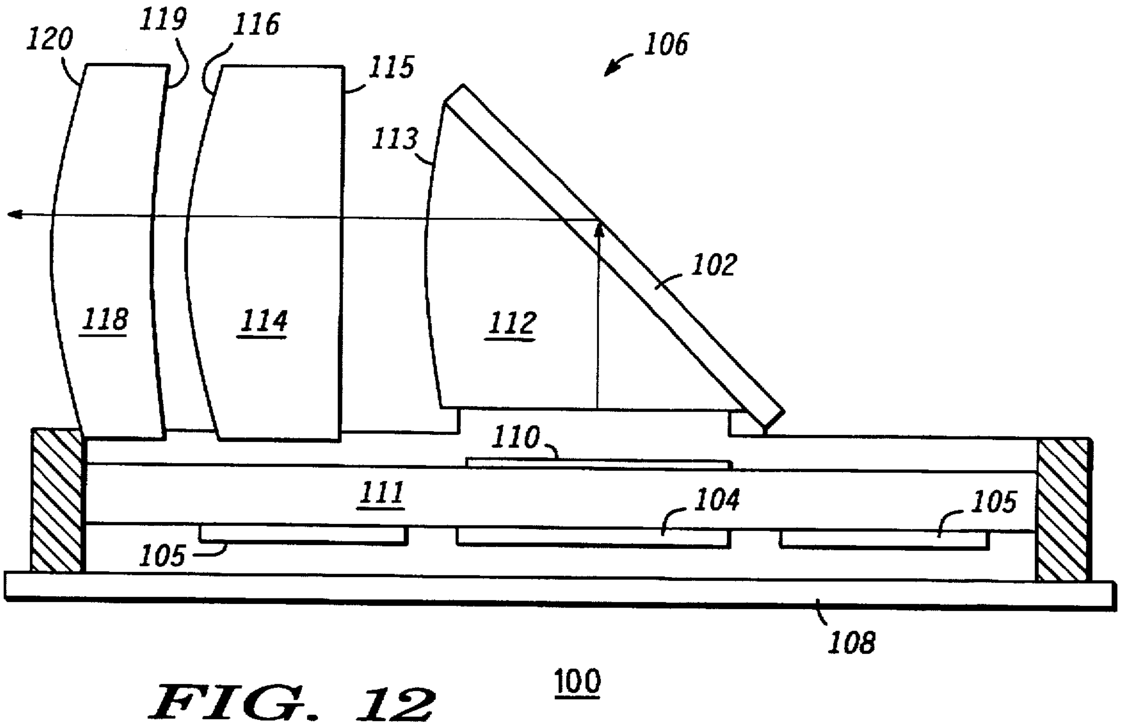
FIG. 12 is a 4× magnified view in side elevation of the apparatus of FIG. 11 utilizing the reflective liquid crystal scanner of the present invention.

Referring specifically to FIG. 12, a 4× magnified view in side elevation of miniature visual image display 100 of FIG. 9 is illustrated for clarity. From this view it can be seen that a polarizing member 110 (generally similar to polarizing member described in conjunction with FIG. 5) is affixed directly to the upper surface of a mounting substrate 111 to which image generation apparatus 104 is mounted. An optical prism 112 is mounted to reflect the image generated by reflective liquid crystal scanner 102 through a refractive surface 113. The image is then directed to an optical lens 114 having a refractive inlet surface 115 and a refractive outlet surface 116. From optical lens 114 the image is directed to an optical lens 118 having an inlet refractive surface 119 and an outlet refractive surface 120. Also, in this embodiment at least one diffractive optical element is provided on one of the surfaces, e.g. surface 113 and/or refractive inlet surface 115, to correct for chromatic and other aberrations. The operator looks into outlet refractive surface 120 of optical lens 118 and sees a large, easily discernible visual image which appears to be behind miniature visual image display 100.

Figure 13:
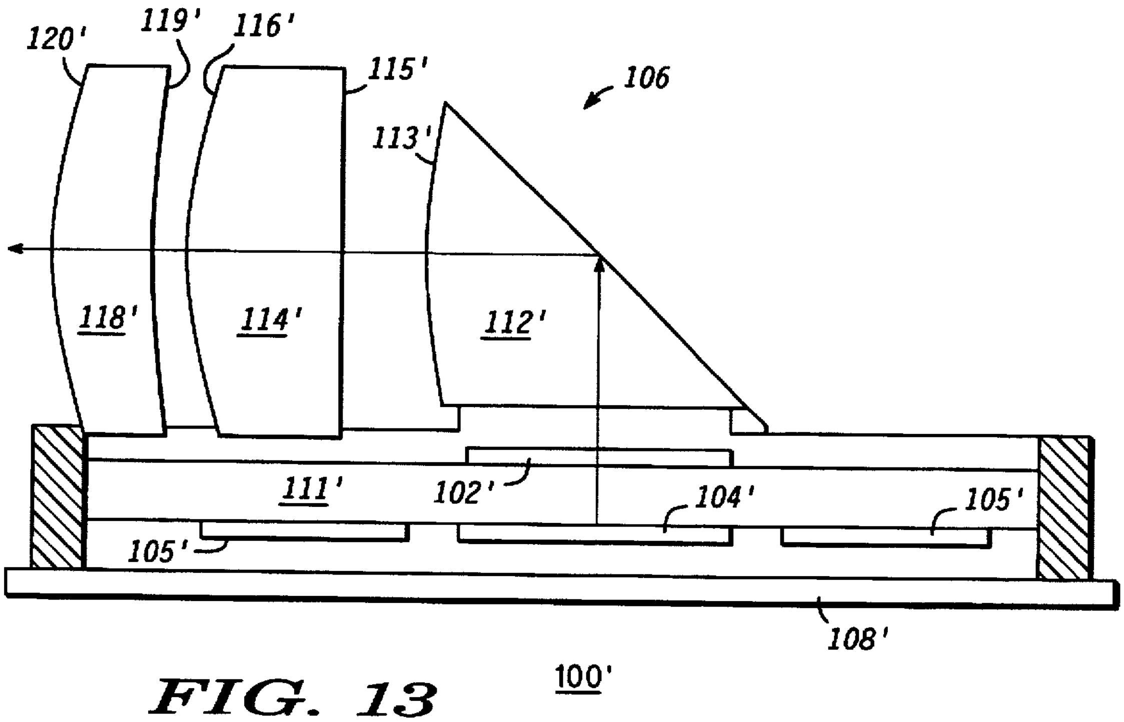
FIG. 13 is a 4× magnified view in side elevation of the apparatus of FIG. 11, utilizing the transmissive liquid crystal scanner of the present invention.

FIG. 13, illustrates yet another 4× magnified view in side elevation of an alternative embodiment of the miniature visual image display of FIG. 9, referenced here as 100', utilizing the transmissive liquid crystal phase spatial light modulator scanner of the present invention. It should be noted that all components similar to the components illustrated in FIG. 12, are designated with similar numbers, having a prime added to indicate the different embodiment or scanning technique utilized. From this view it can be seen that a transmissive liquid crystal scanner 102' (generally similar to transmissive liquid crystal scanner 30' described in conjunction with FIG. 6) is affixed directly to the upper surface of a mounting substrate 111' to which an image generation apparatus 104' is mounted. An optical prism 112' is mounted to reflect the image generated by transmissive liquid crystal scanner 102' through a refractive surface 113'. The image is then directed to an optical lens 114' having a refractive inlet surface 115' and a refractive outlet surface 116'. From optical lens 114' the image is directed to an optical lens 118' having an inlet refractive surface 119' and an outlet refractive surface 120'. Also, in this embodiment at least one diffractive optical element is provided on one of the surfaces, e.g. surface 113' and/or refractive inlet surface 115', to correct for chromatic and other aberrations. The operator looks into outlet refractive surface 120' of optical lens 118' and sees a large, easily discernible visual image which appears to be behind miniature visual image display 100'.

It is anticipated by this disclosure that the plurality of optical elements disclosed in FIGS. 8–13, include reflective elements, refractive elements, diffractive elements, polarizers, diffusers, or holographic lenses that may be mounted in overlying relationship to image generation apparatus, specifically positioned on an interior aspect of the optical magnifier. It is further disclosed that a plurality of optical elements, including reflective elements, refractive elements, diffractive elements or diffusers may be mounted in overlying relationship to the surface of the optical magnifier through which the light, or resultant integrated image, is output, specifically positioned on an exterior aspect of a light output surface, to form an image plane for the reflected light which forms the resultant integrated image.

Thus, a new and improved visual display system incorporating a phase spatial light modulator scanner, which serves to spatially modulate the phase of light emitted by a light emitting device display chip is disclosed which is relatively easy and inexpensive to manufacture and having additional components as parts thereof. The visual display system components ruggedly mount an image source, various optical components and a phase spatial light modulator scanning device, such as a liquid crystal phase spatial light modulator scanner, while conveniently integrating electrical connections to the components and providing external connections thereto. Light sources, polarizers, diffusers and, if desired, additional optics are conveniently integrated into the small visual display system which is easily integrated into a housing, forming an optical magnifier, for use in portable electronic equipment. It is further disclosed that additional optical elements, such as polarizer plates or layers, refractive elements, diffractive elements, etc. may be easily positioned exterior the housing. By using light emitting devices for the light source, with low fill factors, which are scanned by the phase spatial light modulator scanner to generate a resultant integrated image, characterized by high resolution, the size of the system is further reduced and the electrical power required is also minimized.

While we have shown and described specific embodiments of the present invention, further modifications and improvement will occur to those skilled in the art. We desire it to be understood, therefore, that this invention is not limited to the particular forms shown and we intend in the appended claims to cover all modifications that do not depart from the spirit and scope of this invention.

What is claimed is:

1. A visual display system comprising:

an image source, comprised of a plurality of light emitting devices, each of the light emitting devices capable of emitting light;

a liquid crystal phase spatial light modulator scanner, defining an array of liquid crystal scanner pixels, positioned to receive and scan the light emitted by the plurality of light emitting devices, the array of liquid crystal scanner pixels defined by a layer of liquid crystal material contained within the liquid crystal phase spatial light modulator scanner in a continuous layer across the entire array, each of the control circuits for each liquid crystal scanner pixel formed in the array includes one contact formed of a reflective metal, thereby allowing the liquid crystal phase spatial light modulator scanner to operate in a reflective mode, the array further including an optically clear contact positioned on an opposite surface of the continuous layer with the one contact and the optically clear contact defining a pixel within the continuous layer, the liquid crystal phase spatial light modulator scanner including a substrate, an electrically conductive material positioned on the substrate, at least one molecular orientation layer positioned in overlying relationship to the electrically conductive material, a tubular glass spacer positioned in overlying relationship to the at least one molecular orientation layer, a glass plate positioned in overlying relationship to the tubular glass spacer, and a liquid crystal material positioned within the tubular glass spacer; and a plurality of driver/control circuits connected to the plurality of light emitting devices and a plurality of driver/control circuits connected to the liquid crystal phase spatial light modulator scanner for delivering a voltage across the scanner, thereby modulating in phase the light emitted by the light emitting devices, passing therethrough, and generating a resultant integrated image viewable by an observer.

2. A visual display system as claimed in claim 1 wherein the one contact for each of the control circuits for each liquid crystal scanner pixel formed in the array is a polished pad of metal, one for each liquid crystal scanner pixel, which pad of metal forms the one contact included in the control circuit, thereby causing the light emitted by the light emitting devices to enter the scanner, pass through the liquid crystal material, undergoing a change in phase, be reflected back by the polished pad of metal, passing back through the scanner, undergoing a second change in phase, prior to exiting the scanner.

3. A visual display system as claimed in claim 2 wherein the polished pad of metal for each liquid crystal scanner pixel is a polished pad of aluminum.

4. A visual display system as claimed in claim 3 wherein the polished pad of metal forming the one contact for each of the control circuit for each liquid crystal scanner pixel formed in the array is fabricated on the substrate, wherein the substrate is comprised of silicon and has formed therein driver circuitry.

5. A visual display system comprising:

a liquid crystal scanner including a substrate with at least one control circuit formed therein, each control circuit including control terminals adjacent an outer edge of the substrate and at least one electrical contact formed therein, each of the at least one electrical contact defining a liquid crystal pixel and a first electrical contact for the liquid crystal pixel, at least one molecular orientation layer positioned in overlying relationship to at least one first electrical contact, a layer of liquid crystal material positioned in overlying relationship to the at least one molecular orientation layer, a layer of electrically conductive material positioned to form a second electrical contact for each liquid crystal pixel and a glass plate positioned overlying the layer of electrically conductive material;

an image source, comprised of an array of light emitting devices, each positioned to emit light into the liquid crystal scanner;

a plurality of driver/control circuits having data input terminals and further having control signal output terminals connected to each of the electrical contacts of the light emitting devices through a plurality of connection pads, for activating and controlling each of the light emitting devices of the array of light emitting devices to generate an image in accordance with data signals applied to the data input terminals;

a plurality of driver/control circuits having data input terminals and further having control signal output terminals connected to the at least one liquid crystal pixel through a plurality of connection pads, for activating and controlling each of the liquid crystal pixels and applying a voltage thereto, thereby modulating in phase the light passing into the liquid crystal scanner and generating a resultant integrated image viewable by an observer; and a light polarizing member positioned between the image source and the liquid crystal scanner so that light emitted by the image source passes therethrough.

6. A visual display system as claimed in claim 5 wherein the array of light emitting devices of the image source is formed in a two-dimensional array.

7. A visual display system as claimed in claim 6 wherein the liquid crystal scanner is comprised of a plurality of liquid crystal scanner pixels, defined by a plurality of first electrical contacts and the plurality of second electrical contacts.

8. A visual display system as claimed in claim 7 wherein the liquid crystal scanner is further comprised of a first molecular orientation layer positioned in overlying relationship to the first electrical contacts and on a surface of the liquid crystal material, and a second molecular orientation layer positioned on an opposite surface of the liquid crystal material.

9. A visual display system as claimed in claim 8 wherein the layer of liquid crystal material is contained within a cavity having internal opposed flat surfaces formed by the first and second molecular orientation layers and a spacer having a central opening defined therein, positioned between the molecular orientation layers so as to completely encircle the first and second electrical contacts.

10. An electro-optical system comprising:

a light emitting device display chip, comprised of an array of light emitting devices, each of the light emitting devices capable of emitting light;

a liquid crystal scanner, comprised of an array of liquid crystal scanner pixels, formed on a substrate with each of the liquid crystal scanner pixels including a control circuit formed in the substrate, each control circuit including control terminals adjacent an outer edge of the substrate, at least one molecular orientation layer, electrically conductive material forming the control circuit of each liquid crystal scanner pixel, and a continuous layer of liquid crystal material positioned so that light passing into the liquid crystal scanner passes through the liquid crystal material, that when having a voltage applied thereto, causes a modulation in phase of the light passing therethrough;

a housing, defining an optical magnifier, having a light input and a light output, the liquid crystal scanner and the light emitting device display chip being mounted within the housing, the housing thereby encapsulating the liquid crystal scanner and the light emitting device display chip;

a polarizing element, positioned between the light emitting device display chip and the liquid crystal scanner; and an optical magnification system, comprised of a plurality of optical elements, positioned so that light emitted by the liquid crystal scanner is directed through the optical magnification system, thereby generating a resultant integrated image, viewable by an observer.

11. An electro-optical system as claimed in claim 10 wherein the plurality of optical elements are molded, thereby forming a portion of the housing.

12. An electro-optical system as claimed in claim 11 wherein the plurality of optical elements are positioned within the housing.

13. An electro-optical system as claimed in claim 12 wherein the liquid crystal scanner is formed of optically transparent material, thereby scanning the light emitted by the light emitting device display chip, and emitting therethrough light of a different phase, thus operating in a transmissive mode.

14. An electro-optical system as claimed in claim 12 wherein the liquid crystal scanner is fabricated to include a reflective material, thereby scanning the light emitted by the light emitting device display chip as it enters the liquid crystal scanner, and reflecting the light back through the liquid crystal scanner, thereby emitting light having undergone two phase changes, thus operating in a reflective mode.

15. An electro-optical system as claimed in claim 10 wherein the resultant integrated image is viewable as one of a direct view image, a miniature virtual image, and a projected image.

16. A method of phase spatial light modulation comprising the steps of:

providing an image source, composed of a two-dimensional array of light emitting devices, each fabricated to emit light;

providing a liquid crystal scanner, composed of a substrate, an electrically conductive material, positioned on the substrate, thereby forming an electrical contact, a first molecular orientation layer, a glass spacer, defining therein a cavity, a liquid crystal material deposited within the cavity, a second molecular orientation layer overlying an upper surface of the liquid crystal material, a layer of optically transparent electrically conductive material overlying an upper surface of the second molecular orientation layer and thereby forming a second electrical contact and defining a plurality of liquid crystal pixels, and a glass plate, overlying the layer of electrically conductive material;

providing driver/control circuitry to the array of light emitting devices of the image source;

providing driver/control circuitry to the liquid crystal scanner;

positioning and aligning the image source a distance from the liquid crystal scanner, thereby capable of directing light into the liquid crystal scanner;

positioning a polarizing element between the image source and the liquid crystal scanner;

activating the driver/control circuitry of the image source to emit light into the liquid crystal scanner; and scanning the light emitted by the light emitting devices by applying varying voltages across the liquid crystal scanner, thereby activating the plurality of liquid crystal pixels and reorienting the structure of the liquid crystal material, resulting in a modulation in phase of light passing therethrough and generating a resultant integrated image viewable by an observer.

17. A method of phase spatial light modulation as claimed in claim 16 wherein the liquid crystal scanner operates in a transmissive mode.

18. A method of phase spatial light modulation as claimed in claim 16 wherein the liquid crystal scanner operates in a reflective mode.

19. A method of phase spatial light modulation as claimed in claim 16 wherein the step of scanning the light emitted by the light emitting devices includes at least one of sub-pixel scanning, sub-array scanning, and pixel-group scanning.

* * * * *